United States Patent
Ye et al.

(10) Patent No.: US 9,317,686 B1
(45) Date of Patent: Apr. 19, 2016

(54) FILE BACKUP TO COMBAT RANSOMWARE

(71) Applicants: Hua Ye, Nanjing (CN); Weichao Dai, Nanjing (CN); Xiaodong Huang, Nanjing (CN)

(72) Inventors: Hua Ye, Nanjing (CN); Weichao Dai, Nanjing (CN); Xiaodong Huang, Nanjing (CN)

(73) Assignee: Trend Micro Inc., Tokyo (JP)

( * ) Notice: Subject to any disclaimer, the term of this patent is extended or adjusted under 35 U.S.C. 154(b) by 62 days.

(21) Appl. No.: 13/943,534

(22) Filed: Jul. 16, 2013

(51) Int. Cl.
*G06F 21/00* (2013.01)
*G06F 21/56* (2013.01)
*G06F 11/14* (2006.01)

(52) U.S. Cl.
CPC ............ *G06F 21/56* (2013.01); *G06F 11/1448* (2013.01)

(58) Field of Classification Search
CPC ..... G06F 21/56; G06F 21/566; G06F 21/445; G06F 11/1448
USPC .......................................................... 726/24
See application file for complete search history.

(56) References Cited

U.S. PATENT DOCUMENTS

| | | | |
|---|---|---|---|
| 6,611,850 B1* | 8/2003 | Shen | |
| 6,971,019 B1* | 11/2005 | Nachenberg | 713/188 |
| 8,220,053 B1* | 7/2012 | Sun et al. | 726/24 |
| 8,782,403 B1* | 7/2014 | Satish | G06F 21/6218 713/165 |
| 8,825,606 B1* | 9/2014 | Zhang et al. | 707/679 |
| 8,868,979 B1* | 10/2014 | Zhang et al. | 714/36 |
| 9,064,130 B1* | 6/2015 | Asheghian | G06F 21/6281 |
| 2004/0107199 A1* | 6/2004 | Dalrymple et al. | 707/100 |
| 2006/0179484 A1* | 8/2006 | Scrimsher | G06F 21/568 726/23 |
| 2007/0056035 A1* | 3/2007 | Copley | G06F 21/566 726/22 |
| 2008/0016564 A1* | 1/2008 | Claudatos et al. | 726/22 |
| 2011/0082838 A1* | 4/2011 | Niemela | 707/654 |
| 2012/0254999 A1* | 10/2012 | Sallam | 726/23 |
| 2013/0067576 A1* | 3/2013 | Niemela | 726/24 |
| 2013/0067600 A1* | 3/2013 | Graham | G06F 21/335 726/30 |
| 2013/0117854 A1* | 5/2013 | Britton | G06F 21/56 726/24 |
| 2013/0333039 A1* | 12/2013 | Kelly | 726/24 |
| 2014/0289851 A1* | 9/2014 | Klein | G06F 21/54 726/23 |
| 2014/0310800 A1* | 10/2014 | Kabra et al. | 726/17 |

* cited by examiner

*Primary Examiner* — Michael Pyzocha
(74) *Attorney, Agent, or Firm* — Beyer Law Group LLP

(57) ABSTRACT

Operating system events are monitored and a file change request of a process is detected. If the process is suspicious, then the file to be changed is backed up and then the process is allowed to change the file as requested. If it is later determined that the process is ransomware, the process is blocked and further file backups are halted. The original file is recovered and the encrypted file is discarded. If it is later determined that the process is not malicious, then further file backups are halted. Any backup files are discarded. Ransomware may be detected by comparing a file extension of the process with file extensions of any files requested to be changed, by comparing file extensions of any files requested to be changed, or by an analysis of behavior of the process itself.

26 Claims, 3 Drawing Sheets

FILE BACKUP TO COMBAT RANSOMWARE

FIELD OF THE INVENTION

The present invention relates generally to antivirus software. More specifically, the present invention relates to detection and prevention of malicious software that encrypts files on a computer hard drive.

BACKGROUND OF THE INVENTION

Malicious software (such as computer viruses, worms, etc., known as "malware") is often a problem for computer users and the antivirus service providers constantly deal with new threats. One type of new threat that is currently causing problems for users is termed ransomware.

As its name implies, ransomware is a class of malware which restricts access to the computer system that it infects, and often requires that a ransom be paid to the creator of the malware in order for the restriction to be removed. Some forms of ransomware encrypt files on the computer's hard drive, while others may simply lock the computer; in any case, the ransomware displays messages intended to convince the user to pay the ransom. Apparently, ransomware is a new way for cybercriminals to defraud computer users after the decline of fake antivirus software. According to antivirus service providers, ransomware is one of the top security threat predictions for 2013 and the number of instances of ransomware continues to increase dramatically since 2011.

Basically, ransomware can be classified into two categories: encrypting ransomware and non-encrypting ransomware. Encrypting ransomware encrypts personal files on the hard drive. More sophisticated ransomware malware may encrypt the victim's data with a random symmetric key and a fixed public key. By design, the malware author is the only one who knows the necessary symmetric key or private decryption key. The malware author is then in a position to demand a ransom, and, in some cases, even if the victim pays money to the cybercriminal the cybercriminal may not decrypt the hard drive. It can be a disaster for a computer user to lose years' worth of data, pictures and files. The situation can be much worse for an enterprise if the malware encrypts all of the data that employees need to access on a corporate network.

The most notorious ransomware to date is "GpCode." For example, the malware "Trojan-Ransom.Win32.Gpcode.bk" (a Kaspersky detection name) encrypts all user files having dozens of extensions. The malware encrypts documents, pictures, archives, database source files, source code and HTML pages. All valuable data on a computer will be unusable. The latest Gpcode variant generates an AES 256-bit key and uses the criminal's public RSA 1024-bit key to encrypt the AES key. Without the private key, it is nearly impossible to decrypt the encrypted files.

Current technology used to combat ransomware involves techniques used after the encryption has occurred. For example, for ransomware that uses a custom encryption routine, one antivirus service provider provides special software tools to decrypt the files after hacking into the encryption routine in the virus body. In addition, if the malware creates a new encrypted file in a different location and then deletes the original file, it is sometimes possible to recover the original file with disk recovery tools such as "PhotoRec." Unfortunately, with the evolution of ransomware and its use of stronger and stronger cryptography, it can be impossible to decrypt the files after infection.

Thus, most all of the current techniques rely upon recovering from the ransomware infection. But, the user's data cannot be recovered if the cryptography is strong. Relying upon periodic backup of files is often not practical because not all users will perform this task. And, in some cases, users backup their files on the same hard disk or backup files on a separate hard disk which may also be affected by the malware. Accordingly, new techniques are desired that can effectively combat ransomware.

SUMMARY OF THE INVENTION

To achieve the foregoing, and in accordance with the purpose of the present invention, a technique is disclosed that not only detects that ransomware is in operation, but also backs up files before the ransomware has an opportunity to encrypt the files and removes the ransomware.

The disclosed technique protects a user and his or her computer files in real time and can prevent encryption of large number of files. Even if files are encrypted by the ransomware, the user's data can be recovered via the backups that occur in real time. Moreover, using behavior-based detection, ransomware can be blocked soon after it begins to encrypt a certain number of files. Thus, a backup engine does not need to backup a great number files which produces a limited impact on system performance.

In a first embodiment, system events are monitored and a file change event of a process is detected. If the process is determined to be suspicious, then the file to be changed is backed up and then the file is allowed to be changed by the process. When it is determined that the process is ransomware, the process is blocked and further file backups are halted. The original file is recovered and the encrypted file is discarded.

In a second embodiment, a system monitor detects that a particular process is requesting that a computer file be changed. If it is determined that the process is suspicious, then the computer file is backed up to a location other than the hard disk before the file is allowed to be changed as requested. When it is concluded that the process is not malicious, then any file backups associated with the process are halted. The backed up file may be discarded.

In a third embodiment, a file is backed up when it is determined that a suspicious process requests to change the file. It may be concluded that the suspicious process is ransomware by comparing a file extension of the process with file extensions of any files requested to be changed, by comparing file extensions of any files requested to be changed, or by an analysis of behavior of the process itself.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Rather than addressing the problem created by ransomware after it occurs, i.e., attempting to decrypt encrypted files, the present invention detects and blocks ransomware in real time. In addition, it is realized that real-time monitoring of system processes is fast enough to detect ransomware before it encrypts a file, thus allowing the file to be backed up before the ransomware encrypts the file. Cleverly, the present invention may allow a certain number of files to be encrypted; because those files will be backed up before encryption by the ransomware, it is of no matter that they will be encrypted. Once an infection of ransomware is confirmed, the malware may be removed.

System Architecture

Figure 1:
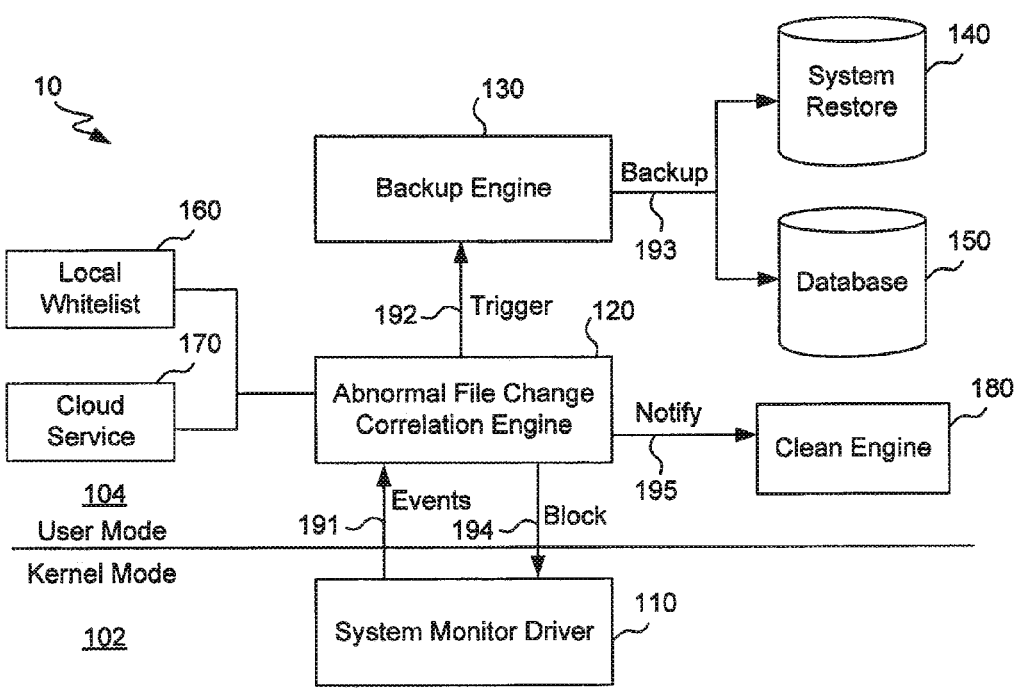
FIG. 1 is a system architecture of software modules and databases on a computer used to combat ransomware.

FIG. 1 is a system architecture 10 of software modules and databases on a computer used to combat ransomware. The computer may be any suitable computing device such as a desktop computer, laptop computer, file server, mainframe computer, tablet computer, or even a mobile telephone. As is known in the art, typically an operating system of the computer includes a kernel mode 102 (which includes processes managed by the operating system), and a user mode 104 (which includes user processes).

System 10 includes a system monitor driver 110 which resides in the kernel. This software module hooks relevant system events such as: file events (e.g., open file, write file, delete file, create file, rename file); registry events (e.g., create registry key, add registry value, delete registry key, delete registry value); process and thread events (e.g., create new process, create new thread, terminate process, terminate thread); and network events (e.g., the IP address of a remote server, the port used to connect, the URL to access, etc.). Any of the user mode modules will be able to receive events from this driver.

The abnormal file change correlation engine 120 is a software module with the responsibility to detect any malicious or file encryption activity by correlating events received from system monitor driver 110. The correlation engine 120 also determines whether to back up a file before the file is changed (e.g., written to or deleted). For example, when a suspicious process launches, engine 120 may notify backup engine 130 to back up files that the process will change. If engine 120 confirms that the process is ransomware (e.g., by correlating events from that process), it may notify driver 110 to block this process and call clean engine 180 to remove the process. If the engine 120 confirms that the process is harmless, it may notify backup engine 132 to cease backing up files. The engine 120 may use rules to apply to received events, and these rules may be deployed as a pattern file and this pattern file is updatable. When the correlation engine starts to run, it loads the rules of the pattern into memory of the computer.

Backup engine 130 is a software module for performing file backup. Because of the correlation performed by correlation engine 120, backup engine 130 only needs to backup files about to be changed by a suspicious process. After the process has been analyzed by correlation engine 120, there typically will be no further need for file backup. If the process is judged to be normal, the correlation engine can ignore later events and previously made backups can be removed. If the process is judged to be malicious, the process will be blocked (and thus no further need to backup files that might be changed). Thus, the number of backup requests is limited and the impact on system performance is relatively minor. Any data that was actually encrypted by ransomware may be recovered from the backed up files. In fact, in order to better protect user's data, backup engine 130 may even trigger creation of a system restore point.

System restore database 140 is a database that may be used by the System Restore system utility in the Microsoft operating system to create a restore point for later recovery of files. As is known in the art, a restore point maybe created at any point in time for any number of computer files, and the state of these files at this time may be recovered at a future time. Other utilities in other operating systems may also be used to create the equivalent of a restore point and may also utilize database 140. Database 150 is any suitable database used to backup files on the computer. In various embodiments, database 150 exists on the hard disk of the computer, is a database existing on an external hard drive, is a database on an external solid-state drive such as a USB drive or other solid-state medium, is a remote database accessed over the Internet, etc. In one embodiment, the backup database may be located on the same hard disk where the computer files are located. The database is protected by the kernel module and any access not from an approved process is forbidden in order to avoid infection from ransomware or other malware.

As mentioned, clean engine 180 is any suitable software module typically provided by an antivirus service provider which is able to remove malware from a computer usually by deleting the actual malware files and deleting malware specific registry entries and other components dropped or downloaded by the malware. Clean engine 180 is presented with the name of a malware file (such as a ransomware file name "C:\Users\kenny\AppData\Roaming\a123.exe") and the clean engine then proceeds to remove this malware and its effects from the computer. One example of a clean engine is Trend Micro's damage cleanup engine. It is able to delete the ransomware file and all related items in a system. The clean engine also is able to access the backup database in order to restore all of the files encrypted by the ransomware, or, the clean engine notifies the backup engine to do this.

Local white list 160 is a white list that includes file identifiers such as file names, unique identifiers, CRC values, MD5 values, etc., that identify files or processes that are known to be benign. White list 160 may be used by the correlation engine to avoid triggering an alert or file backup if the file or process in question causing an event is known to be benign. Similarly, cloud service 170 provides the reputation of a particular file (when provided with information such as the file name, CRC, MD5, or other file identifier) or the reputation of a particular Web site to the correlation engine 120 executing upon the user computer.

Flow Diagram

In general, the workflow of the present invention may be described with reference to FIG. 1. Relevant events are hooked within the system monitor driver 110 (i.e., events that indicate suspicious activity, events that indicate that a particular process may be malware, etc.), and these events are passed 191 to the correlation engine 120 in real time. If the correlation engine determines after a review of events that a potential file change has been initiated by a suspicious process, then the correlation engine sends a trigger signal 192 to backup engine 130. Backup engine 130 then backs up 193 the file into either database 150 or into a system restore point 140. The backed up file may be used to recover from any damage caused by ransomware or other malware. After reviewing the file activities of a particular suspicious process, if the correlation engine confirms that the process is ransomware, then a block signal 194 is sent to driver 110 in order to block the process. In addition, engine 120 will send a notify signal 195 to clean engine 180 in order to clean the ransomware from the computer.

Figure 2:
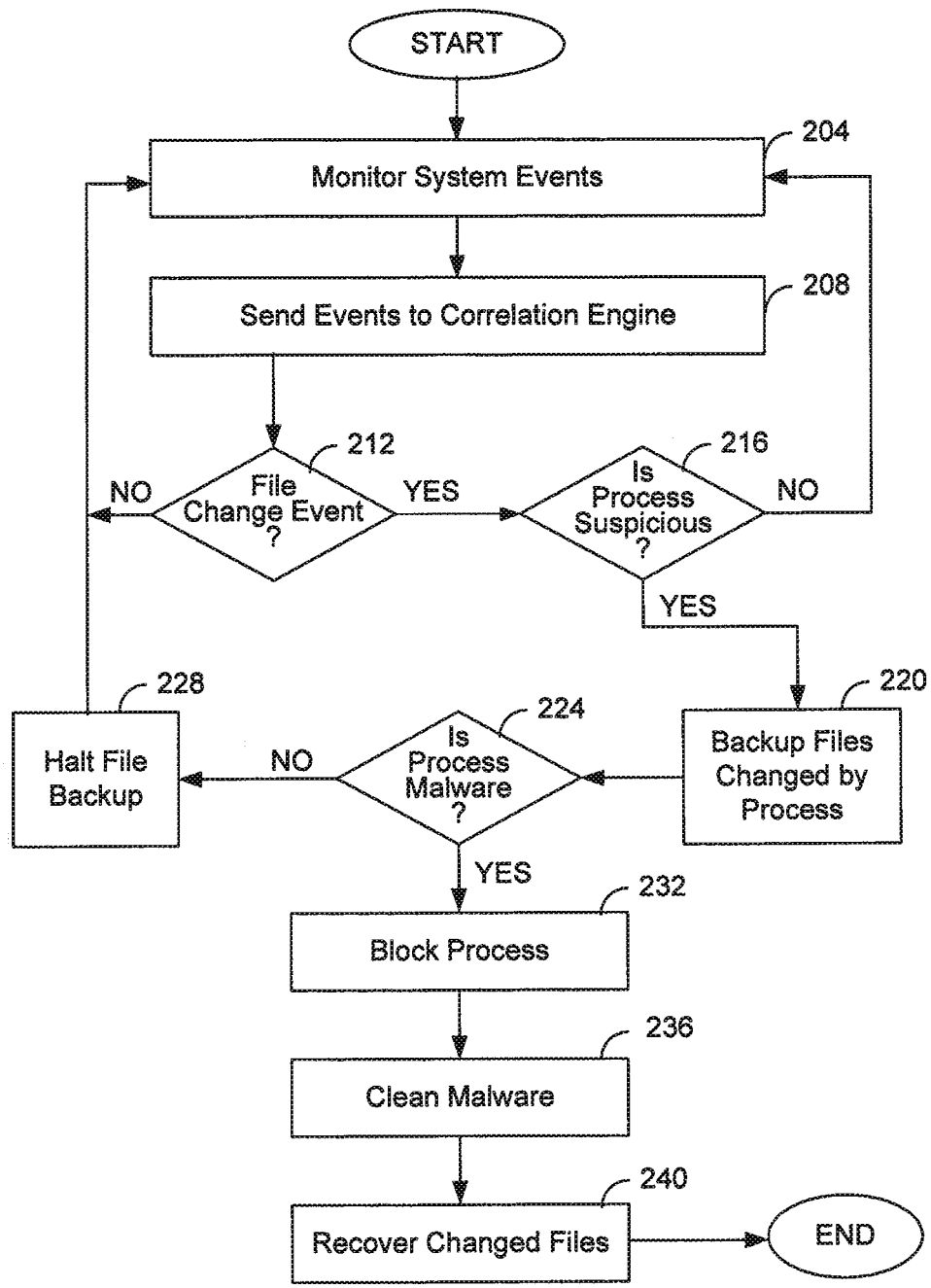
FIG. 2 is a flow diagram describing a specific embodiment of how ransomware is detected and blocked.

FIG. 2 is a flow diagram describing a specific embodiment of how ransomware is detected and blocked. The system monitor driver 110 continuously monitors system events 204 using system hooks. Although driver 110 is able to monitor all system events, in one embodiment it may focus exclusively upon file events in order to detect when a file is about to be changed. Monitoring all events, though, may assist the correlation engine in determining whether or not a particular process is malicious. In step 208 these monitored events are sent to correlation engine 120.

Step 212 determines whether an event has occurred indicating that a user process is attempting to change one of the files on the hard disk (for example, hooking of a system function indicates that a process is attempting to overwrite a file, write a new version of a file, encrypt a file, delete a file, etc.). If no file change event is currently detected, it is likely that ransomware is not currently executing upon the computer and control returns to step 204 for more monitoring of events. On the other hand, if a file change event is detected, then control moves to step 216 to determine whether or not the file in question should be backed up.

Step 216 determines whether the process (or thread) that has requested the file change event is suspicious or not. In general, determining whether a process (or the file that created it) is suspicious may be accomplished using information obtained from operating system hooks installed in the system monitor driver 110, using information from a remote cloud service 170, or from information using a local white list 160. Once all of this information is obtained concerning a particular file or process, then heuristics such as rules may be used to make a determination as to whether the file or process is suspicious.

As explained above, driver 110 hooks a variety of system events and provides information on files, registries, processes, etc. For example, using kernel hooks, it is possible to determine when a file was first created (dropped) on a hard drive of the computer, from where the file came (e.g., downloaded from a particular Web site, dropped by another file, copied from removable media, etc.), and how specifically the file landed on the user's hard drive. Other events that may be hooked include what the file does, any suspicious registry items added, the server to which the computer connects, the communications content with the remote server, etc.

A remote cloud service 170 can also provide the reputation of a particular file as explained above. In addition, the local white list 160 may also provide the reputation of a particular file to the correlation engine. The correlation engine continuously gathers this information (as relevant events 191 are constantly being sent from driver 110) and may especially query a source outside of driver 110 when a particular file or process registers a file change event in the previous step. Once gathered, rules may be used to determine whether a file or process is suspicious.

For example, the following rules (when true) tend to indicate that a file or process is suspicious: the file is dropped on the hard disk while the user views a particular Web site; the user opens an attachment of an e-mail message to access the file; the process is an injected thread; the file has no digital signature and its file reputation is poor; the process added an auto start registry value; the process connects to a suspicious remote network port; etc.

If the process is suspicious, then control moves to step 220. On the other hand, if the process is not suspicious than the system continues to monitor system events as usual and the file is not backed up because it is likely a normal file change event. Of course, step 216 may be performed before step 212, or both steps may be performed more or less at the same time.

Step 220 backs up any file or files that are about to be changed by the event detected in step 212. Bear in mind that the file change event that was hooked by driver 110 and detected in step 212 has not yet changed the file in question. The hook function that detected the file change event allows steps 216 and 220 to occur before control returns to the system function that is attempting to change the file. In other words, the file change event is detected, a determination is made that the process is suspicious, and the file is backed up before the requesting process is allowed to change the file. Once the correlation engine makes the determination to backup the file, a trigger signal is sent to the backup engine which then saves the file in question from the hard disk to either database 150 or to database 140. For example, since the file has not been changed, the backup engine makes a copy of the file and saves it in a special backup folder. Then the engine adds a new record in the backup database. The record includes: the file path of the process, the path of the file to be modified, the backup file name and path, and other information. The database record is then later used to retrieve the backed up file. To reduce the disk usage, the backed up file may be compressed. It can be expanded later when the original file is needed.

After the backup has been performed, control is returned to the system process to allow the file to be modified as requested. This particular implementation may use the callback mechanism in the operating system. For example, the user mode module registers a callback function with the hook module, and all of the correlation and backup work is done in the callback routine. Once this work is finished, control is returned to the hook module from the routine which then returns control to the system process. Once the file has been backed up, then the process is allowed to complete its originally requested file change event.

Steps 204-220 may be performed continuously for any number of file change events and for any number of files that need to be backed up before being changed. The correlation engine is also continuously gathering information in order to make a conclusive determination as to whether the process is malicious. This conclusion may occur before any file change event, or may occur after a file or files have been backed up. Preferably, a conclusion is reached as quickly as possible so that a minimum number of files are backed up. Advantageously, once a determination is made one way or the other, then it is not necessary to continue backing up files that are about to be changed by the process in question.

Accordingly, step 224 determines whether the process is malware, or more specifically, whether the process is ransomware. In general, making a determination that the process is malware may be performed using any of the rules described above in step 216. For example, it may be concluded that a particular process is malicious if it satisfies a certain number of rules.

More specifically, rules specific to detecting ransomware may be used to conclude that the process is ransomware. For example, it is realized that the typical behavior model of ransomware that encrypts files on a computer hard drive is that a process (or thread) A attempts to write or delete files B, C, D. Thus, three particular categories of rules are used. The first category deals with attributes of the process A, and examples of rules in this category are: process A has been determined to be malicious. Examples of rules in the second category deal with the relationship between process A and files B, C, D and include rules such as: process A is not related to software identified by extensions of files B, C, D. In other words, if files B, C, D all have the ".doc" extension (meaning that they are associated with the application Microsoft Word), and process A is not a process of Microsoft Word (or any other text editor), a conclusion may be reached that process A is likely to be ransomware. The third category deals with the relationship between files B, C, D and examples of rules include: the affected files to a certain extent have different extensions; and the affected files reside in different folders. In other words, the extension of file B is ".doc", the extension of the file C is ".xls", and the extension of file D is ".jpeg"; there is no legitimate software that can function with these three different file extensions.

An algorithm is used that provides a weighted value for each rule and if a certain number of rules are true and a threshold value is reached, then a determination is made that the process is ransomware. If so, then control moves to step 232. If the process is not malicious, then control moves to step 228. For example, a calculation may be as follows. Score=1*(count of requested modified files)+2*(count of modified file extensions)+3*(count of modified files in different folders). If the process is suspicious and the requested modifications occur within 3 seconds, and the score is over 20, then the correlation engine will determine that the process is ransomware.

In step 228 file backups are halted (even if file change events are detected and events indicate that the process might be suspicious) because a determination has been reached that the process is not malicious. Backups are halted by setting a flag in the correlation engine indicating that backups are not necessary for a particular process or thread, by similarly alerting the backup engine, or by ignoring the file change event from the particular process or thread and performing no more correlation for that process or thread. Once backups are halted for the particular process then events continue to be monitored as described above.

In step 232 the process in question is blocked (because it is malware or, more specifically is ransomware) by sending a signal from the correlation engine to the system monitor driver. Driver 110 blocks the particular process or thread by making any of its file access request fail.

In step 236 the correlation engine also sends a notification to the clean engine 180 to remove the malicious process and all of its artifacts from the computer. The information that the engine passes to the clean engine is the file path of the malicious process in order to allow the cleaning to occur.

In step 240 the clean engine then directs the backup engine to recover any files that had recently been backed up before they were changed by the malicious process. For example, the clean engine passes the file path of the ransomware to the backup engine. The backup engine then queries the backup database with this path to get the list of all files that have been backed up before the ransomware changed them. Then, the backup engine uses the backed up files to replace the encrypted files one-by-one. The encrypted files may be moved to a special folder or deleted.

In addition, since the original files are recovered, the encrypted files are then made inaccessible (or otherwise unusable) to a computer user or other software application by performing steps such as deleting the encrypted files, changing the names of the encrypted files, moving the encrypted files to an inaccessible location, etc.

In this fashion, the original files are restored to a state before encryption by the ransomware and any file that has been changed or encrypted by the ransomware is removed from the computer or is made inaccessible so that a computer user or software application will not inadvertently access the changed file.

Computer System Embodiment

Figure 3A:
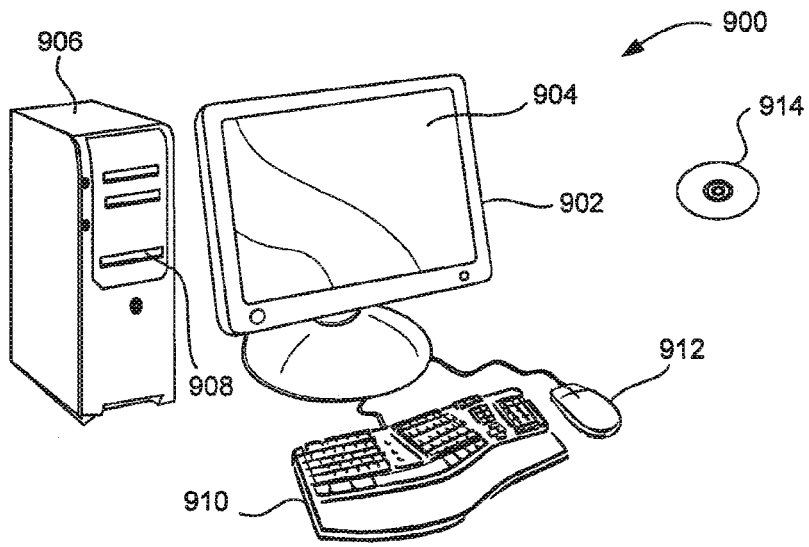
FIGS. 3A and 3B illustrate a computer system suitable for implementing embodiments of the present invention.
Figure 3B:
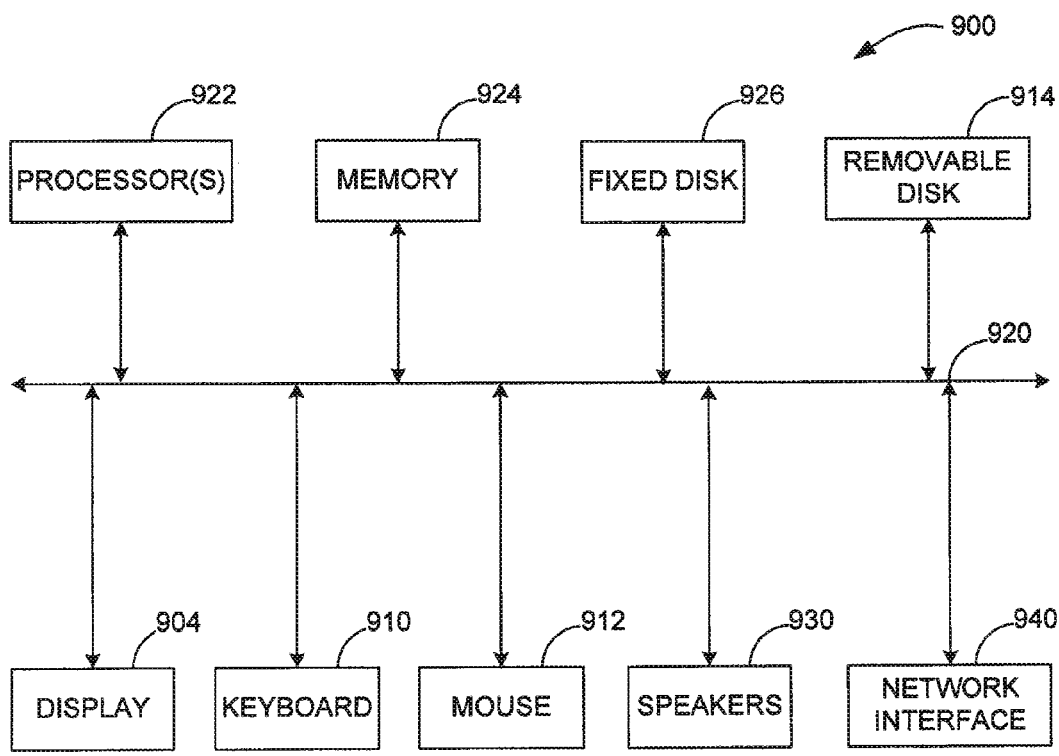

FIGS. 3A and 3B illustrate a computer system 900 suitable for implementing embodiments of the present invention. FIG. 3A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 3B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of backing up a computer file, said method comprising:
    continuously monitoring system events within an operating system of a computer;
    detecting that a process executing on said computer is requesting that said computer file in persistent storage of said computer be changed;
    determining that said process is suspected of being malicious before said computer file is changed;
    backing up said computer file to a storage location different from a current location of said computer file in said persistent storage, said backing up occurring before said computer file is changed and only occurring when said process is suspected of being malicious; and
    allowing said suspicious process to change said computer file as requested;
    determining that said suspicious process is not malicious by comparing a file extension of said computer file with said suspicious process; and
    halting any further file backups for computer files associated with said suspicious process.

2. The method as recited in claim 1 wherein said suspicious process is ransomware, and wherein said suspicious process is allowed to encrypt said computer file.

3. The method as recited in claim 1 wherein said suspicious process executes in user mode of said computer.

4. The method as recited in claim 1 further comprising:
    allowing said suspicious process to encrypt said computer file;
    determining that said suspicious process is ransomware; and
    terminating execution of said suspicious process once said determination of ransomware is made.

5. The method as recited in claim 1 further comprising:
    recovering said backed up computer file from said storage location; and
    rendering inaccessible said changed computer file.

6. The method as recited in claim 1 wherein said detecting includes intercepting an operating system call to change said computer file, said method further comprising:
    returning control to said operating system call after said backing up in order to permit said allowing to occur.

7. The method as recited in claim 1 further comprising:
    determining that said process is suspected of being malicious in real time after said detecting.

8. The method as recited in claim 1 further comprising:
    determining that said suspicious process is not malicious by comparing resident folders of other computer files that said suspicious process is requesting be changed.

9. The method as recited in claim 8 wherein each of said comparing steps produces a weighted value, said method further comprising:
    determining that a score of said weighted values is not over a threshold.

10. A method of backing up a computer file, said method comprising:
    continuously monitoring system events within an operating system of a computer;
    detecting that a process executing on said computer is requesting that said computer file in persistent storage of said computer be changed;
    determining that said process is suspected of being malicious before said computer file is changed;
    backing up said computer file to a storage location different from a current location of said computer file in said persistent storage, said backing up occurring before said computer file is changed and only occurring when said process is suspected of being malicious;
    allowing said suspicious process to change said computer file as requested;
    determining that said suspicious process is not malicious by comparing a file extension of said computer file with said suspicious process; and
    halting any further file backups for computer files associated with said suspicious process.

11. The method as recited in claim 10 wherein said suspicious process executes in user mode of said computer.

12. The method as recited in claim 10 further comprising:
    determining that said suspicious process is not malicious using a local white list on said computer.

13. The method as recited in claim 10 further comprising:
    determining that said suspicious process is not malicious using a remote cloud service.

14. The method as recited in claim 10 wherein said detecting includes intercepting an operating system call to change said computer file, said method further comprising:
    returning control to said operating system call after said backing up in order to permit said allowing to occur.

15. The method as recited in claim 10 further comprising:
    determining that said process is suspected of being malicious in real time after said detecting.

16. The method as recited in claim 10 further comprising:
    determining that said suspicious process is not malicious by comparing resident folders of other computer files that said suspicious process is requesting be changed.

17. The method as recited in claim 16 wherein each of said comparing steps produces a weighted value, said method further comprising:
    determining that a score of said weighted values is not over a threshold.

18. A method of backing up a computer file, said method comprising:
    detecting that a process executing on said computer is requesting that said computer file in persistent storage of said computer be changed;
    determining that said process is suspected of being malicious before said computer file is changed;
    backing up said computer file to a storage location different from a current location of said computer file in said persistent storage, said backing up occurring before said computer file is changed and only occurring when said process is suspected of being malicious;
    allowing said suspicious process to encrypt said computer file as requested;
    determining that said suspicious process is not malicious by comparing a file extension of said computer file with said suspicious process; and
    halting any further file backups for computer files associated with said suspicious process.

19. The method as recited in claim 18 further comprising:
    determining that suspicious process is ransomware by comparing a file extension of said suspicious process with a file extension of said computer file.

20. The method as recited in claim 18 wherein said suspicious process executes in user mode of said computer.

21. The method as recited in claim 18 further comprising:
determining that suspicious process is ransomware by comparing a file extension of said computer file with a file extension of a second computer file that said suspicious process is requesting be changed.

22. The method as recited in claim 18 further comprising:
recovering said backed up computer file from said storage location; and
rendering inaccessible said changed computer file.

23. The method as recited in claim 18 wherein said detecting includes intercepting an operating system call to change said computer file, said method further comprising:
returning control to said operating system call after said backing up in order to permit said allowing to occur.

24. The method as recited in claim 18 further comprising:
determining that said process is suspected of being malicious in real time after said detecting.

25. The method as recited in claim 18 further comprising:
determining that said suspicious process is not malicious by comparing resident folders of other computer files that said suspicious process is requesting be changed.

26. The method as recited in claim 25 wherein each of said comparing steps produces a weighted value, said method further comprising:
determining that a score of said weighted values is not over a threshold.

* * * * *